US007419424B2

(12) United States Patent
Gomez

(10) Patent No.: US 7,419,424 B2
(45) Date of Patent: Sep. 2, 2008

(54) WAGERING GAME HAVING A CARD PROPAGATION FEATURE

(75) Inventor: Alfred T. Gomez, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 356 days.

(21) Appl. No.: 11/338,084

(22) Filed: Jan. 24, 2006

(65) Prior Publication Data

US 2006/0178184 A1 Aug. 10, 2006

Related U.S. Application Data

(60) Provisional application No. 60/646,458, filed on Jan. 24, 2005.

(51) Int. Cl.
*A63F 1/00* (2006.01)
*A63F 13/00* (2006.01)

(52) U.S. Cl. ...................... 463/13; 273/292; 273/143 R

(58) Field of Classification Search .................. 463/13, 463/12, 20; 273/292, 274, 309, 143 R
See application file for complete search history.

(56) References Cited

U.S. PATENT DOCUMENTS 4,743,022 A 5/1988 Wood
5,294,120 A 3/1994 Schultz
5,308,065 A 5/1994 Bridgeman et al.
5,322,295 A 6/1994 Cabot et al.
5,401,023 A 3/1995 Wood
5,431,408 A 7/1995 Adams
5,437,451 A 8/1995 Fulton
5,489,101 A 2/1996 Moody
5,511,781 A 4/1996 Wood et al.
5,531,448 A 7/1996 Moody
5,732,950 A 3/1998 Moody
5,816,916 A 10/1998 Moody
5,823,873 A 10/1998 Moody
5,868,619 A 2/1999 Wood et al.
5,882,259 A 3/1999 Holmes, Jr.
5,954,335 A 9/1999 Moody (Continued)

FOREIGN PATENT DOCUMENTS

WO WO 97/27570 7/1997

OTHER PUBLICATIONS

Draw Poker Variants, web page (6 pages).

*Primary Examiner*—Benjamin H Layno
(74) *Attorney, Agent, or Firm*—Nixon Peabody, LLP.

(57) ABSTRACT

A method and apparatus for playing a multi-hand card game. The game allows the simultaneous play of multiple card hands. The multiple card hands are created from a first card hand—typically including the draw and random selection of additional cards in an attempt to improve the first card hand. All additional card hands are a variant of this first card hand (or each immediately preceding card hand). Specifically, each subsequent card hand is generated as a function of the rank of the immediately preceding card hand (or the first card hand). The generation of the subsequent card hands may be based on each card held in the first card hand. Alternately, the generation of cards for each subsequent card hand may be restrictively applied only to the hold cards from the first card hand with sufficient additional cards randomly selected to complete each of the subsequent card hands.

20 Claims, 8 Drawing Sheets

U.S. PATENT DOCUMENTS 5,957,774 A 9/1999 Holmes, Jr. et al.
5,976,016 A 11/1999 Moody et al.
6,007,066 A 12/1999 Moody
6,012,720 A 1/2000 Webb
6,045,129 A 4/2000 Cooper et al.
6,098,985 A 8/2000 Moody
6,110,040 A 8/2000 Sanduski et al.
6,120,378 A 9/2000 Moody et al.
6,132,311 A 10/2000 Williams
6,149,521 A 11/2000 Sanduski
6,206,780 B1 3/2001 Awada
6,248,016 B1 6/2001 Walker et al.
6,257,979 B1 7/2001 Walker et al.
6,336,860 B1 1/2002 Webb
6,416,407 B1 7/2002 Carrico et al.
6,461,240 B1 10/2002 Perkins
6,471,587 B1 10/2002 Wood et al.
6,474,645 B2 11/2002 Tarantino
6,494,454 B2 12/2002 Adams
6,561,898 B2 5/2003 Moody
6,569,013 B1 5/2003 Taylor
6,569,014 B2 5/2003 Walker et al.
6,595,520 B1 7/2003 Richards et al.
6,595,852 B2 7/2003 Wang
6,612,926 B1 9/2003 Dabrowski
6,612,927 B1 9/2003 Slomiany et al.
6,616,142 B2 9/2003 Adams
6,637,747 B1 10/2003 Garrod
6,672,958 B2 1/2004 Bennett
6,708,975 B1 3/2004 Fox et al.
6,726,427 B2 4/2004 Jarvis et al.
6,780,106 B2 8/2004 DeMar et al.
6,857,957 B2 2/2005 Marks et al.
6,878,060 B2 4/2005 Moody
6,926,607 B2 8/2005 Slomiany et al.
7,017,909 B1 * 3/2006 Awada ....................... 273/292
7,059,965 B2 * 6/2006 Jackson ....................... 463/16
2002/0034974 A1 3/2002 Wood et al.
2002/0169015 A1 11/2002 Moody
2002/0185816 A1 12/2002 Moody et al.
2003/0032469 A1 2/2003 Moody et al.
2003/0038425 A1 2/2003 Tarantino
2003/0064773 A1 4/2003 Baerloucher et al.
2003/0119572 A1 6/2003 Moody et al.
2003/0153377 A1 8/2003 Lisowski, Sr.
2003/0166411 A1 9/2003 Moody
2003/0181232 A1 9/2003 Peccola, Jr.
2003/0186733 A1 10/2003 Wolf et al.
2003/0189290 A1 10/2003 Moody
2003/0214097 A1 11/2003 Moody
2004/0043807 A1 3/2004 Pennington
2004/0132524 A1 7/2004 Ramstad et al.
2004/0248641 A1 12/2004 Jarvis et al.

* cited by examiner

WAGERING GAME HAVING A CARD PROPAGATION FEATURE

CROSS REFERENCE TO RELATED APPLICATIONS

This application claims the benefit of priority of U.S. Provisional Patent Application No. 60/646,458, filed Jan. 24, 2005, which is hereby incorporated by reference in its entirety.

FIELD OF THE INVENTION

The present invention generally relates to gaming machines and, more particularly, to gaming machines having a multi-hand card game.

BACKGROUND OF THE INVENTION

Gaming machines, such as slot machines and video poker machines are integral to the success of the gaming industry. Video poker machines have been particularly popular with players. A variety of video poker games have been developed to appeal to a broad spectrum of players. The best video poker games are extremely successful and remain successful year after year. There is a continuing need for gaming machine manufacturers to produce new types of card games for video gaming machines to continue to satisfy consumer demand for new and more entertaining games.

One concept that has been successfully employed to enhance the entertainment value of video poker games is to allow simultaneous play of multiple card hands. One genre of this game mechanic allows a player to propagate selected cards from a base hand through the remaining simultaneously played card hands. Ostensibly, a player can select his most promising cards and propagate these cards into other hands to increase the player's probability of winning.

As with all forms of entertainment, players look for new and more entertaining games. What is needed is a new type of poker game that propagates an advantage in an initial base card hand into a number of simultaneous played poker hands using a new and more interesting method.

SUMMARY OF THE INVENTION

According to one embodiment of the present invention, a method of playing a gaming machine is disclosed. The method comprises the act of displaying a set of cards randomly selected from a group of cards. Each of the cards in the group of cards has a rank. The method further comprises the acts of selecting hold cards from the set of cards and forming a first card hand with the hold cards and with sufficient additional cards randomly selected from the group of cards to complete the first card hand. The method further comprises the acts of forming a second card hand having cards with the next higher rank of each card in the first card hand and making an award for each card hand with a winning combination.

According to another embodiment or the present invention, a gaming machine is disclosed. The gaming machine comprises a wager acceptor, a central processor unit, a player input device, a display, and a payoff mechanism. The wager acceptor accepts a wager to initiate game play. The central processor unit forms a first card hand from hold cards selected from a set of cards randomly selected from a group of cards and with sufficient additional cards randomly selected from the group of cards to complete the first card hand. Each of the cards in the group of cards has a rank and a suit. The central processor unit further forms a second card hand having cards with the next higher rank of the same suit of each hold card and with sufficient additional cards to complete the second card hand. The player input device selects the hold cards from the set of cards. The display is in communication with the central processor unit. The display displays the set of cards and each card hand. The payoff mechanism is in communication with the central processor unit to make an award for each card hand having a winning combination.

According to yet another embodiment of the present invention, a method of playing a gaming machine is disclosed. The method comprises the acts of making a wager to initiate game play and displaying a set of cards randomly selected from a group of cards. Each of the cards in the group of cards has a rank. The method further comprises the acts of selecting one or more hold cards from the set of cards and forming a first card hand with the hold cards and with sufficient additional cards randomly selected from the group of cards to complete the first card hand. The method further comprises the act of forming a second card hand having one or more cards that are dependent on the rank of one or more of the cards in the first card hand and any additional cards sufficient to complete the second card hand. The method further comprises the act of making an award for each card hand with a winning combination.

The above summary of the present invention is not intended to represent each embodiment, or every aspect, of the present invention. Additional features and benefits of the present invention are apparent from the detailed description, figures, and claims set forth below.

BRIEF DESCRIPTION OF THE DRAWINGS

The foregoing and other advantages of the invention will become apparent upon reading the following detailed description and upon reference to the drawings.

Figure 1:
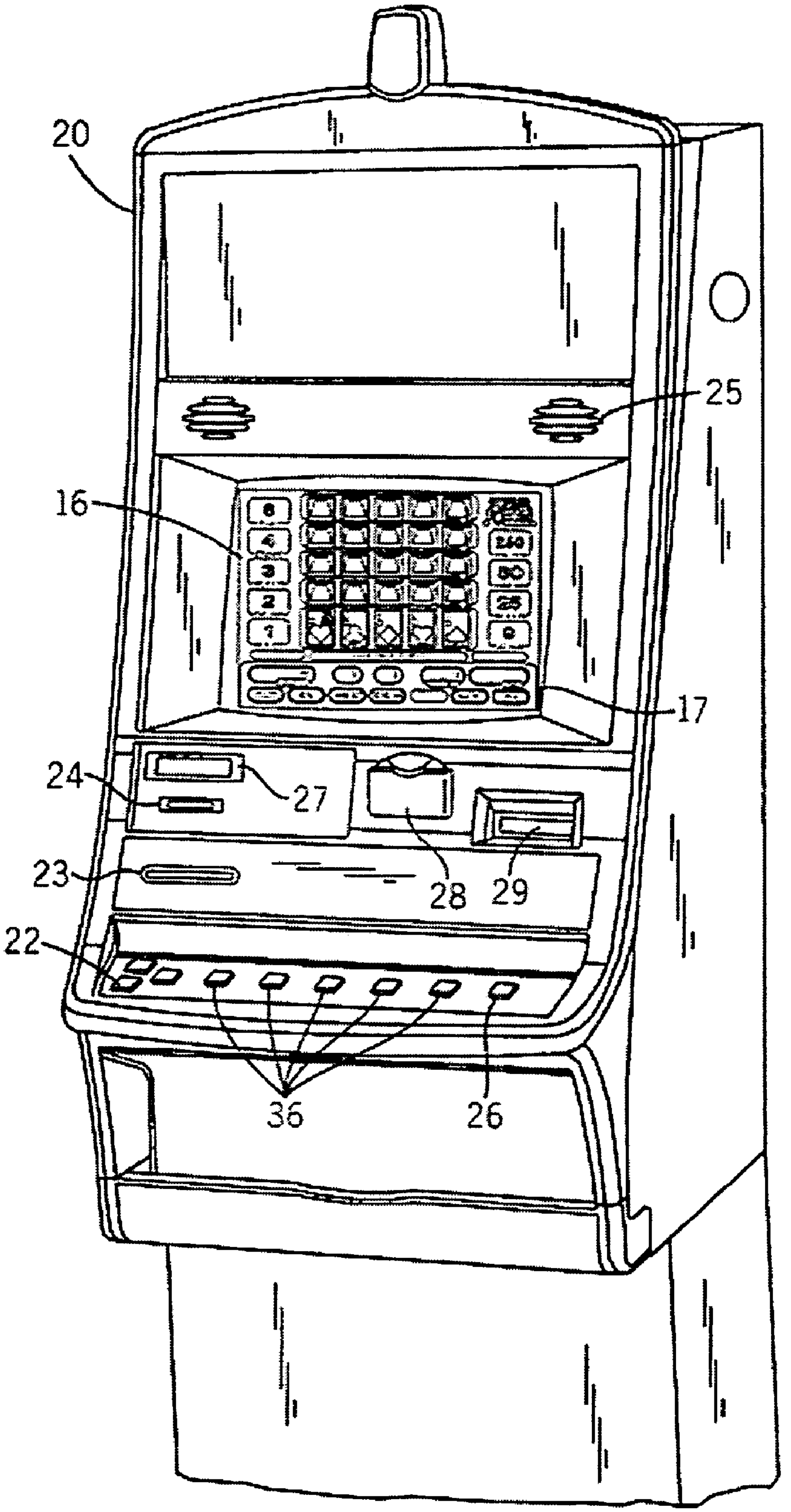
FIG. 1 is a perspective view of a video gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to a gaming machine (such as a video gaming machine) having an improved game play mechanic to enhance the entertainment value of a multi-hand card game such as poker. The game allows the simultaneous play of multiple card hands. The cards favored by the player in the first hand are selectable by the player and held. Each of these hold cards is propagated into the remaining hands using the next higher rank of the same suit to populate each of the succeeding card hands. The non-held cards are discarded and replaced with drawn cards. These drawn cards in the first card hand may also be propagated into each succeeding hand in the same manner. The propagation of these cards from the base hand (or first card hand) into each succeeding hand produces a visually interesting display and provides an intriguing game play mechanic. This game is called Tower Poker and is applicable to all types of card games.

Escalating the rank of the card hands produces interesting results. Escalating ranks alters optimum play strategies for producing a winning game outcome dependent on the first card hand. Besides altering the game play characteristics, the escalating card hands introduce greater volatility to the game. All these factors produce a more interesting and entertaining game.

Turning to FIG. 1, a video type gaming machine 20 is shown. The video gaming machine 20 of FIG. 1 uses a video display 16 to display the game outcome. The video display 16 may use a CRT, LED, LCD, or generally any other type of video display. The video display 16 may also include a touch screen 17 to allow players to make game selections.

In the illustrated embodiment shown in FIG. 1, the gaming machine 20 is an "upright" version in which the video display 16 is oriented vertically relative to the player. It will be appreciated, however, that any of several other models of gaming machines are within the scope of the present invention, including, for example, a "slant-top" video gaming machine in which the video display 16 is slanted at about a 30° angle toward the player.

Figure 2:
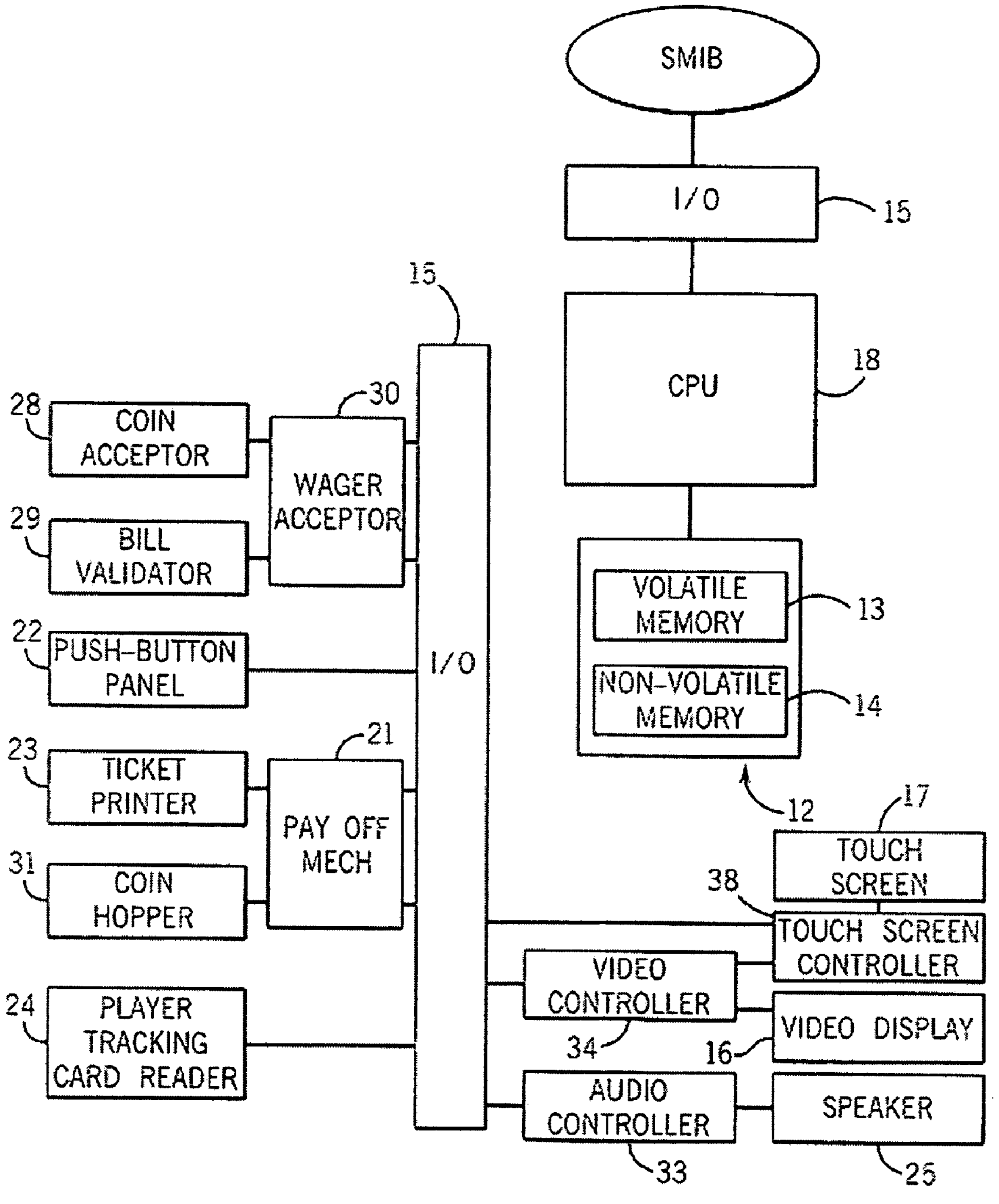
FIG. 2 is a block diagram of a control system suitable for operating the video gaming machine of FIG. 1.

Referring also to FIG. 2, a block diagram of a control system suitable for operating the gaming machine of FIG. 1 is shown. A CPU 18 controls the gaming machine 20 through an I/O bus 15 that communicates with a variety of peripheral devices used in the gaming machine 20. These peripheral devices include: a coin acceptor 28, touch screen controller 38, speakers 25, and bill validator 29, etc. For example, a wager acceptor 30 (such as a coin acceptor 28 or a bill validator 29) accepts a wager from a player. The coin acceptor 28 or bill validator 29 signals CPU 18 when bills or coins are inserted into the gaming machine 20.

The CPU 18 could also be part of a central server in communication over a computer network with the gaming machine 20. The central server could determine the game outcomes for display on the gaming machine 20. The gaming machine 20 may still have a CPU to control and communicate with the gaming machines peripheral devices.

Besides inserting a wager, the player may also insert a player-tracking card in the player-tracking card reader 24 to identify the player to the computer network controlling the gaming system. The player-tracking display 27 allows the player-tracking system to communicate with the player.

The CPU 18 executes a game program that causes the video display 16 to display the card game. The player may select the number of simultaneous card hands to play using the hands bet icon 53 (FIG. 3) and the wager amount using the bet per hand icon 54 (FIG. 3) via the touch screen 17 or a push-button panel 22.

The game commences in response to the player placing a wager and activating the game through the push-button panel 22 or the touch screen 17, causing the CPU 18 to initiate the card game. The CPU 18 randomly draws a card hand using a random number generator (RNG). Typically, video poker gaming machines have a hold push-button 36 on the push-button panel 22 to hold specific cards in a card hand. The player may also use the touch screen 17. These hold cards 46 (FIG. 4) remain in the player's hand after the player hits the deal/draw icon 52 on the touch screen display 17 or the deal/draw button 26 on the push-button panel 22. After the deal/draw button 26 or icon 52 (FIG. 3) has been activated, the non-held cards are discarded and drawn cards 47 (FIG. 6) are inserted into the player's hand.

The programming necessary for the gaming machine 20 to execute game functions is stored in system memory 12. This stored program is operable in association with the CPU 18 to execute the program's instructions on the gaming machine's various peripheral devices including the video display 16, coin acceptor 28, bill validator 29, and push-button panel 22. The system memory 12 stores control software, operational instructions, and data. In one embodiment, the system memory 12 comprises a non-volatile memory (separate read-only memory (ROM)) 14 and volatile memory (random access memory (RAM)) 13. The system memory 12 may be implemented on any of several alternative types of memory structures or may be implemented on a single memory structure.

A payoff mechanism 21 is operable in response to instructions from the CPU 18 to award a payoff of credits to the player in response to certain winning outcomes that may occur in the game. Cash from a coin hopper 31 or a cashless ticket from a ticket printer 23 may be dispensed to provide a payoff to the player for a winning combination.

Figure 3:
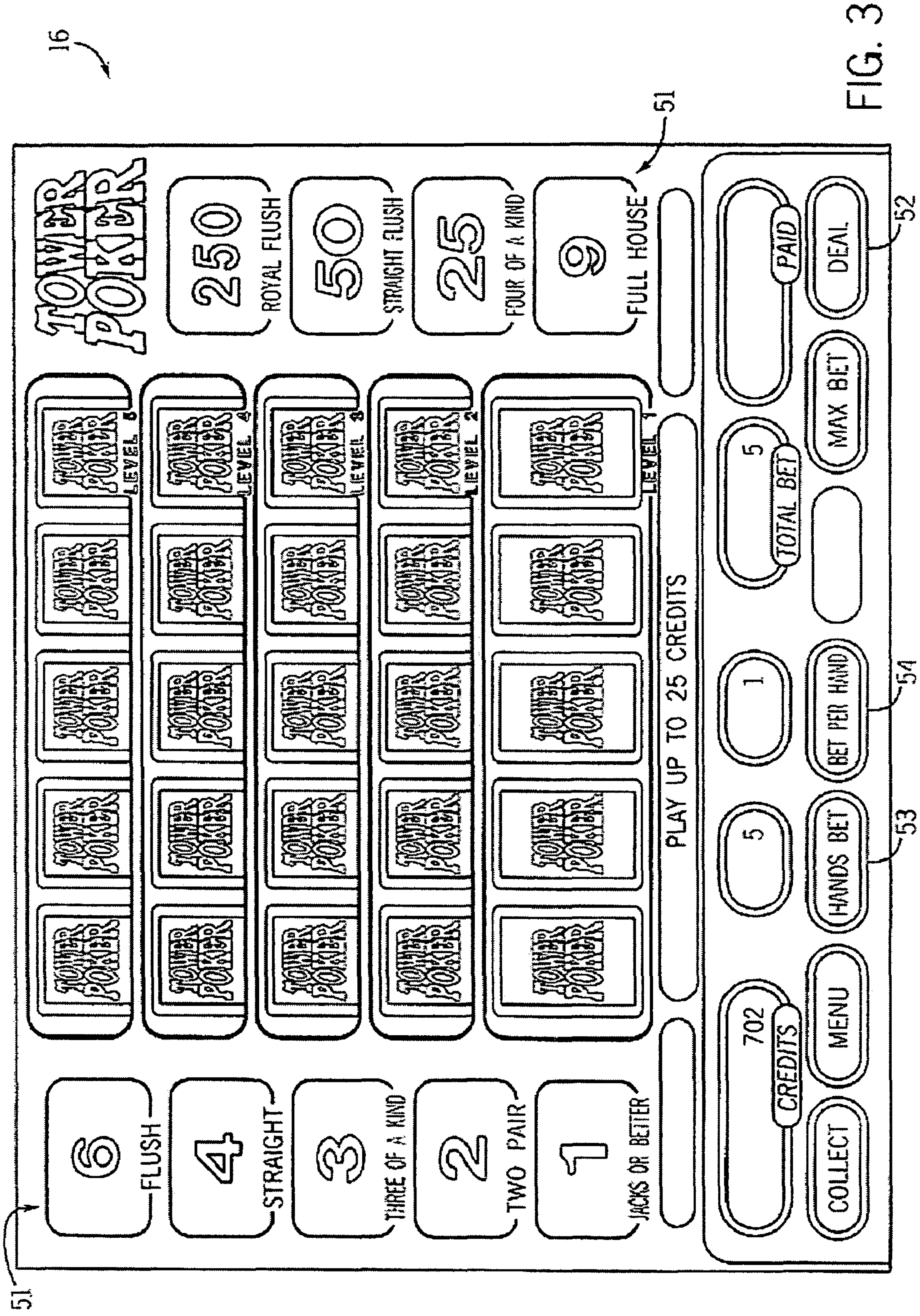
FIG. 3 is a screen display of the initial game with five card hands in play.

The payoff amounts correspond to specific winning combinations available in the card game and are listed in a pay table 51 and stored in system memory 12. FIG. 3 displays the pay table 51 around the periphery of the video display 16. For example, in the popular card game of poker, typical winning combinations include a pair (or a pair of at least Jacks or higher rank), two pairs, three of the kind, full house, four of a kind, straight, flush, straight flush, and royal flush. Other additionally winning combinations could also be specified.

Gaming machines 20 also typically include speakers 25 as illustrated in FIG. 1. These speakers 25 broadcast the game's audio output to the player. The audio output may include messages related to game play or background music to accompany game play.

The speaker output is controlled by CPU 18 using a digital signal processor (DSP) to process audio data. The CPU 18 may also include memory for storing the audio data (typically called a data set) that the DSP processes. System memory 12 may also be used to store audio data sets. The processed audio data set is converted to analog audio signals that are amplified external to the main control board by an audio controller 33 and transmitted to the speakers 25 to provide audio output. Alternately, the audio controller 33 may contain the major audio components typically included in the CPU 18.

In a similar manner, video sequences used to display game outcomes may be stored in system memory 12. The CPU 18 retrieves the video sequence corresponding to the game outcome selected by the RNG. The video sequence comprises a video data set ported to a video controller 34 to produce a video image on the video display 16. Any type of audio and video control systems such as though as described above, and any number of variants may be used to implement the present invention.

The above-described video gaming machine 20 may be used to implement the game play mechanics of the multi-hand card game described below either with or without player participation. Turning to FIG. 3, the video display 16 shows a card game with an initial wager sufficient to simultaneously play five different card hands. The wager amount, in one embodiment, determines the number of simultaneously played poker hands. In this example, the player may play two to five card hands simultaneously—although the game could be played using more than five simultaneously played card hands. The gaming machine 20 may allow different wagers or the same wagers to be placed on each of the different card hands. On the periphery of the screen display is the pay table 51 for winning combinations as represented by the cards in each of the card hands.

Figure 4:
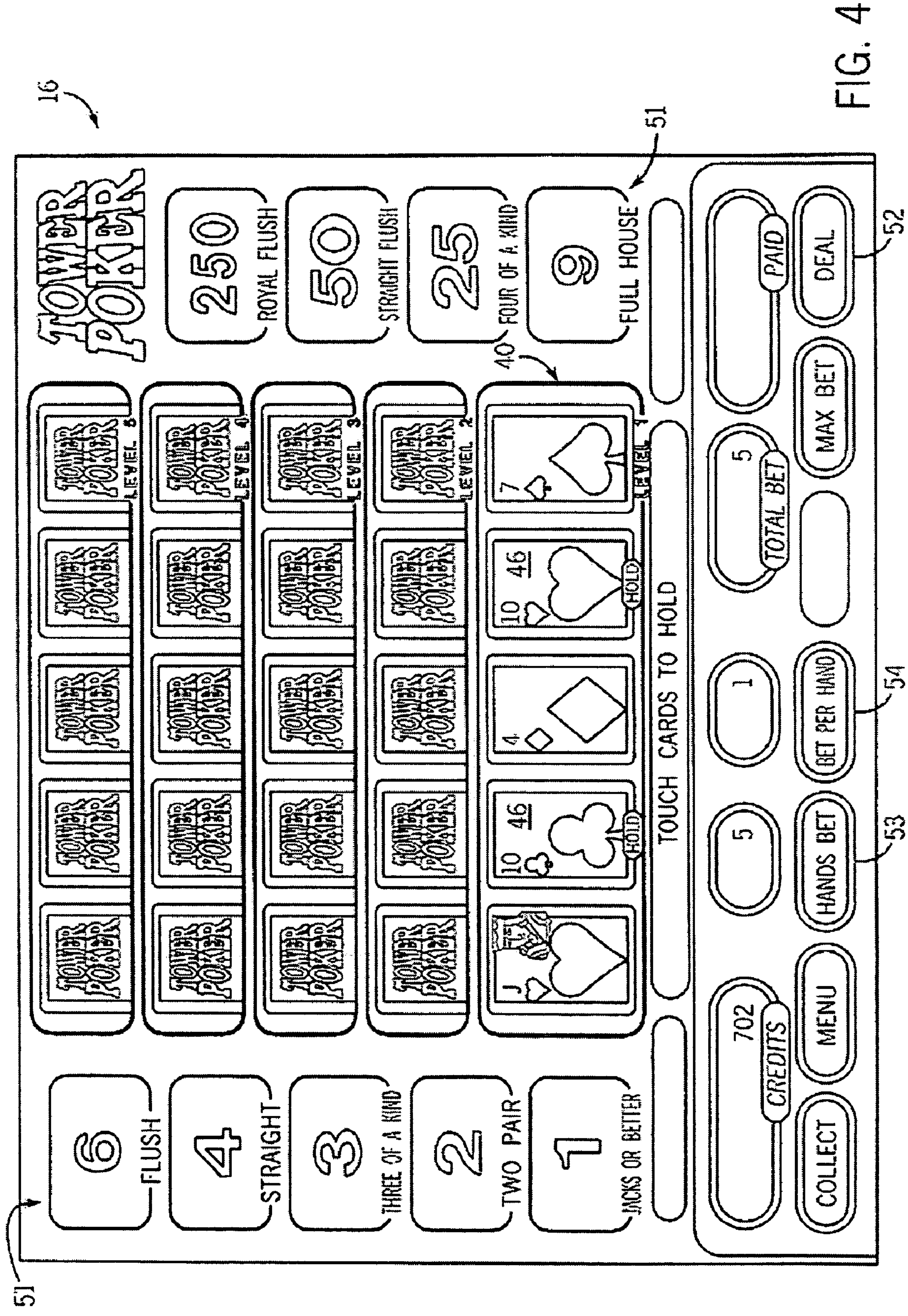
FIG. 4 is a screen display of the initial card set randomly selected by the gaming machine.

The card game is initiated with the player receiving an initial set of cards (or card set) 40 as shown in FIG. 4. The initial card set is randomly selected from a group of cards. This group of cards may be a standard card deck or any deck that has escalating ranks or any other hierarchical organization.

In at least one embodiment, the number of cards in the initial card set 40 equals the number of cards required for the game's card hand. For example, in a standard five-card poker game, the initial card set 40 may contain five cards. The initial card set, however, could also contain six, seven, or more cards. This initial card set 40 is reduced to the required number of cards (five for a five-card poker game) through the subsequent hold, discard, and replacement process to produce a five-card hand. Similarly, the initial card set 40 for a three-card poker game may be three cards or a greater number of cards than required for the card hand. Any additional cards beyond the required number of cards simply give the player greater flexibility and a greater likelihood of producing a winning game hand.

The player now examines the initial card set 40 and selects hold cards 46 for inclusion in the first card hand 41. The number of cards that the player may hold may be predetermined, randomly determined, or may be any number up to a maximum limit. For example, in a five-card poker game, any number of cards may be held; for example, all five cards may be held, all five discarded, or any number in between may be held. Alternately, the maximum number of cards that can be held may be less than all of the cards in the card hand. For example, the player may only hold up to three cards. The player may customize the game to set the maximum number of held cards with the gaming machine 20 selecting an appropriate pay table 51. The player may also decide, in one embodiment, not to hold any of the cards from the initial card set.

Alternatively, the gaming machine 20 may not require any player participation, and may use an auto-hold feature that selects for the player the most probable winning game outcome. The player may also customize the strategy for playing the game and further customize the auto-hold feature by specifying how much risk and volatility the player wishes to experience—not necessarily producing the greatest likelihood of a winning game outcome but the game play strategy that is most likely to produce the highest payback.

FIG. 4 is a screen display of the selected cards held by the player—in this example, the 10 of clubs and the 10 of hearts. These hold cards 46 are designated as such with the "hold" icon located below each held card. The two hold cards 46 in the first card hand 41 are the basis for developing each of the subsequent card hands. Each subsequent card hand builds from the immediately preceding card hand, escalating the rank of each card in the preceding card hand to form the subsequent card hand.

Figure 5:
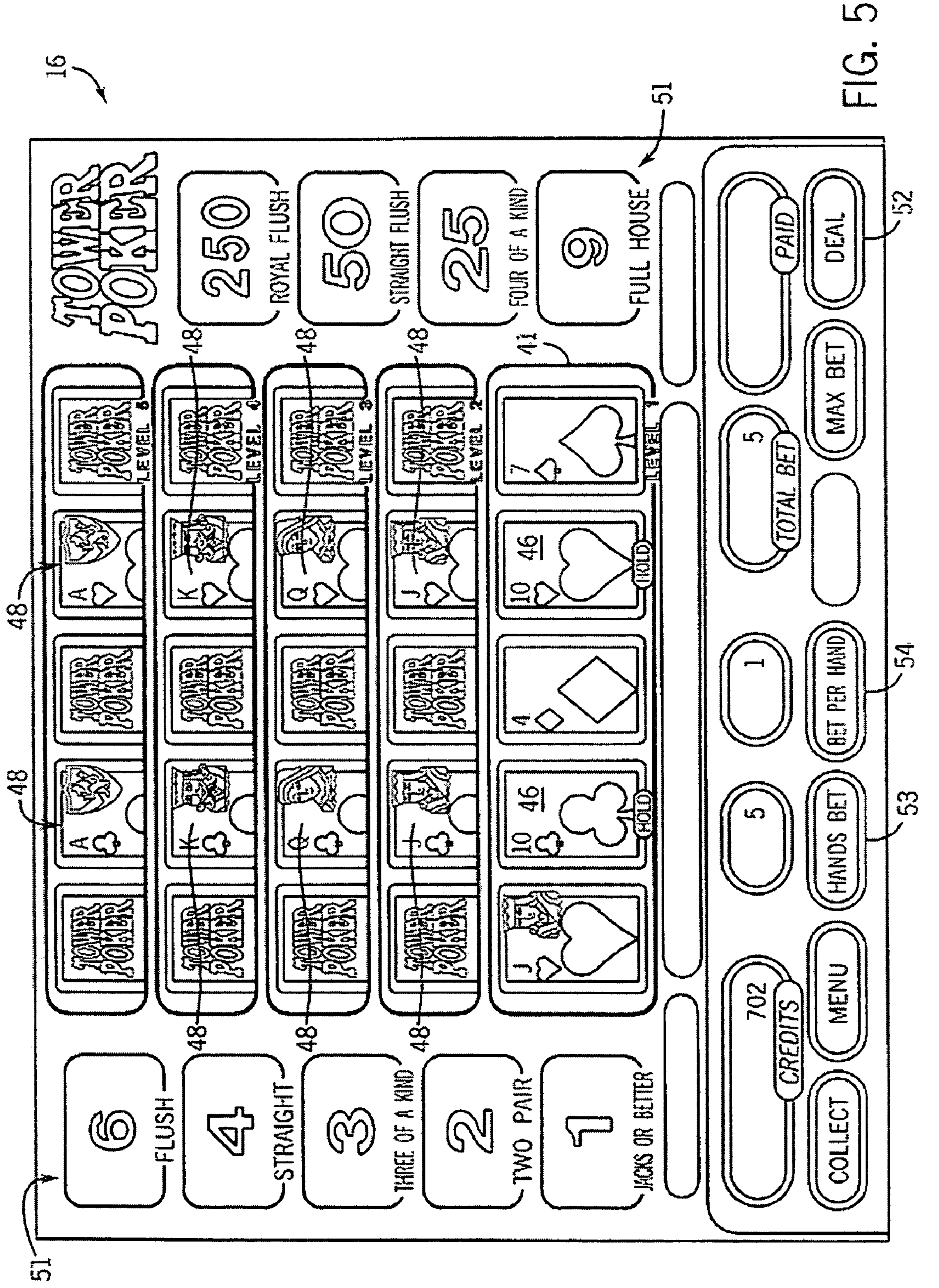
FIG. 5 is a screen display of the player selected hold cards.

As can be seen from FIG. 5, the first hold card 46 (the 10 of clubs in the first level) escalates in rank to a jack of clubs in the second level, to a queen of clubs in the third level, to a king of clubs in the fourth level, and the ace of clubs in the fifth level. Similarly, the other hold card 46 (10 of hearts in the first level) escalates in rank to a jack of hearts in the second level, to a queen of hearts in the third level, to a king of hearts in the fourth level, and to the ace of hearts in the fifth level. Each of the cards dependent on the hold cards 46 in the first card hand 41 are generated cards 48 in the subsequent card hands.

Figure 6:
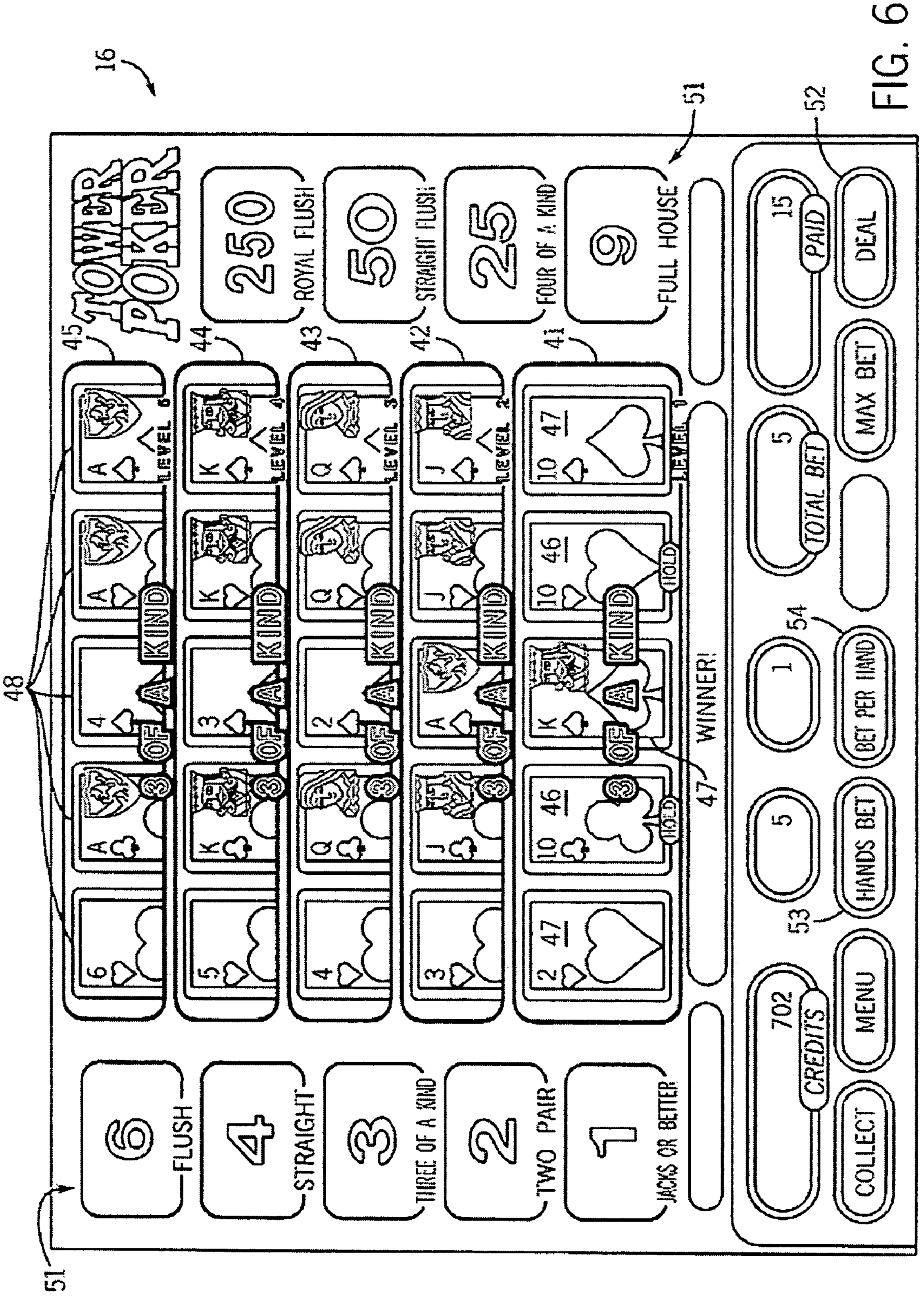
FIG. 6 is a screen display of a first card hand formed with the hold cards of FIG. 5 and the drawn cards to replace the non-held cards of FIG. 5 propagated through each card hand.

As shown in FIG. 6, the player's selected cards are held, all other cards are discarded, and sufficient additional cards are dealt such that the hold cards 46 and the drawn cards 47 produce a game outcome for the first card hand 41. This process is shown in FIG. 6, wherein the non-held cards of FIG. 5 (jack of hearts, 4 of diamonds, and 7 of spades) have been discarded and replaced with the 2 of hearts, the king of spades, and a 10 of spades.

Each of these randomly selected drawn cards 47 provides the basis for completing the remaining card hands using the same propagating mechanic as described above for the held cards (e.g., using a sequentially higher rank of the same suit for each card in the preceding card hand to form the subsequent card hand).

For example, the second poker hand 42 is formed from the first card hand 41 using the next higher rank of the same suit for each card in the first card hand to create the second card hand. In another embodiment, the suit of each card need not be the same. For example, the suit for each subsequent hand may be randomly determined. Alternately, the suits of the held cards are replicated and the suits of the drawn cards 47 are randomly determined in each of the subsequent hands.

The third poker hand 43 (and each additional card hand formed thereafter) builds on the immediately preceding card hand in the same manner. In the third card hand 43, the second card hand 42 is used to create the third card hand by using the next higher rank of the same suit from the second card hand to populate the third card hand.

Each card hand is individually evaluated to determine if a winning combination has been formed. As can be seen in FIG. 6, in each of the card games the player has won three of a kind because of the sequentially escalating card rank propagation. The player is awarded for each of the five card hands played according to a three of a kind pay table award.

Figure 7:
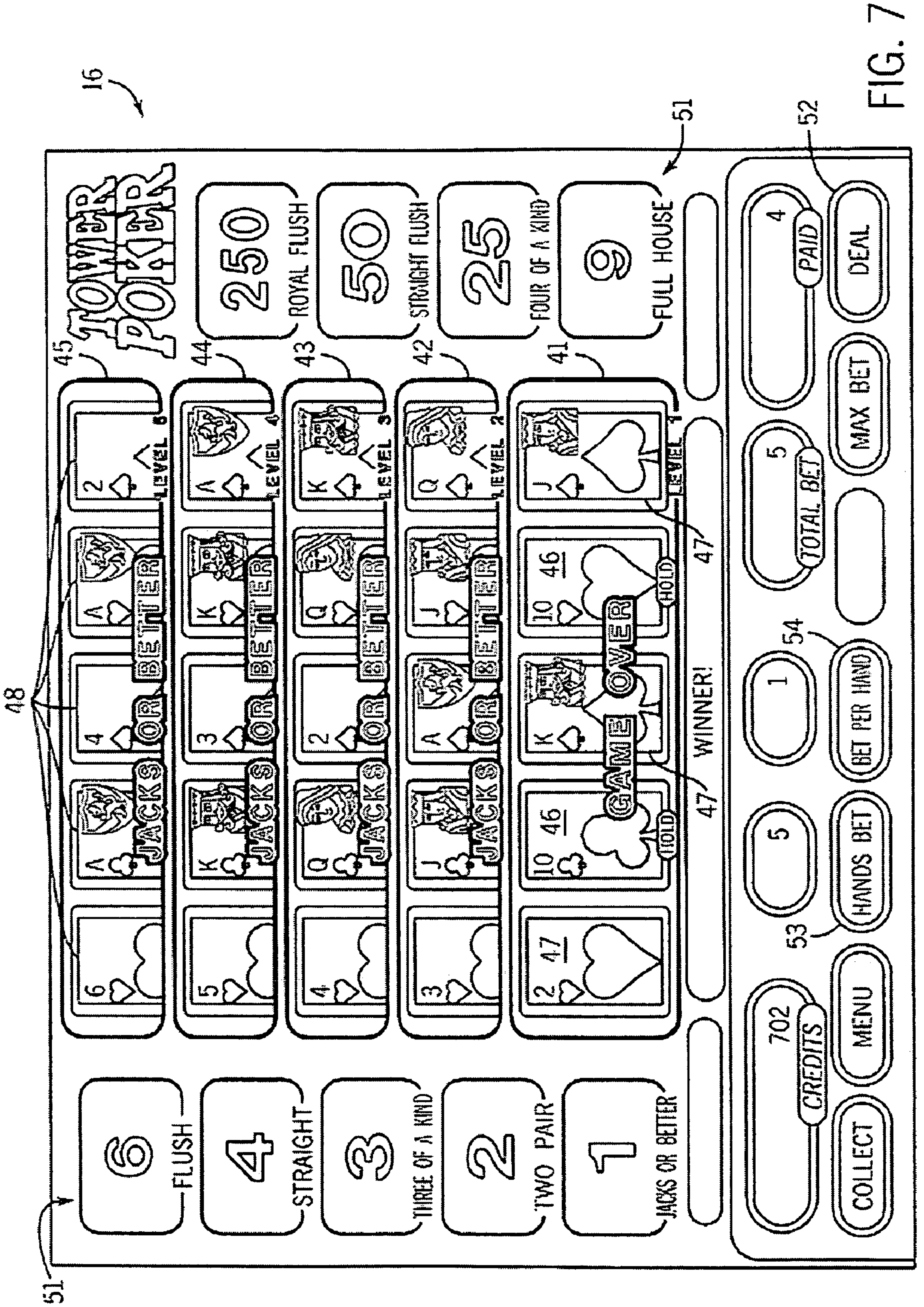
FIG. 7 is a screen display of the first card hand with an alternate outcome using the hold cards of FIG. 5 and different randomly drawn cards for the non-held cards of FIG. 5.

Had the player not drawn a winning combination in the first card hand 41, the player could still win on the subsequently built card hands. This is shown in FIG. 7. Here, the player has not drawn a winning card hand in the first card hand. The sequentially escalating progression of card rank, however, gives the player a winning combination in all of the remaining card hands. As exemplified by this game, this type of sequential progression can form unexpected win patterns, even when the base game is lost. These types of unexpected win combinations provide an exciting game experience for the player.

Figure 8:
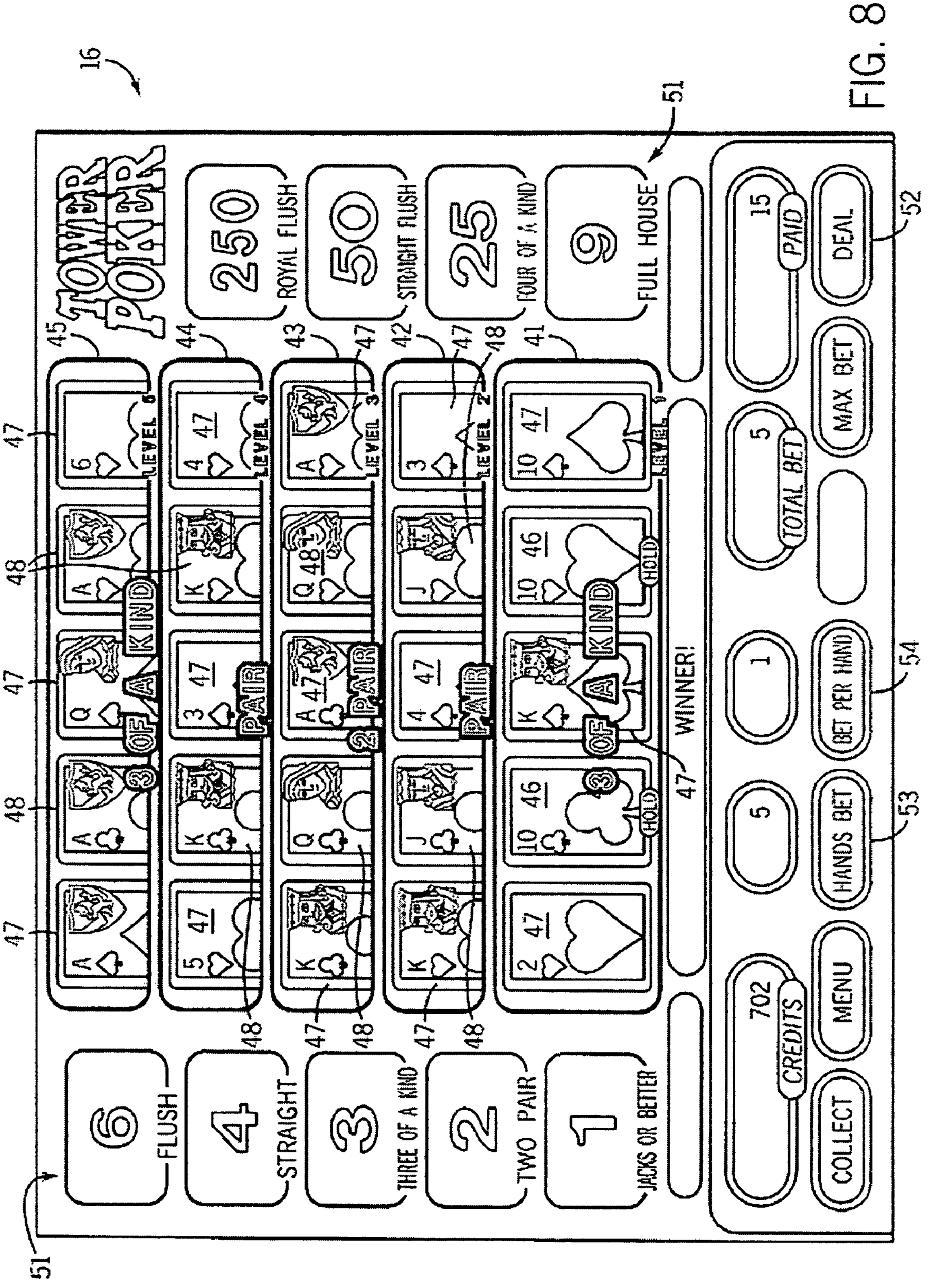
FIG. 8 is a screen display of an alternate game embodiment in which only the hold cards of the first card hand are propagated into the remaining card hands.

In another embodiment, only the hold cards 46 from the first card hand 41 are "towered" in escalating rank into the subsequent hands (i.e., generated cards 48). This is shown in FIG. 8. The remaining cards necessary to create a card hand are randomly selected from a group of cards for each card hand. This group of cards, in one embodiment, does not contain the generated cards 48 (sequentially higher ranks of the hold cards 46) contained in the card hand to be filled. For example, as can be seen from FIG. 8, the hold cards 46 are the 10 of clubs and the 10 of hearts. Only the hold cards 46 are propagated into the remaining hands with sequentially increasing rank. The drawn cards 47 (including the 10 of spades, the king of spades and the 2 of hearts) in the first card hand 41 are not "towered" into the remaining card hands. Rather, the remaining card hands are filled with sufficient additional cards (drawn cards 47) to complete a card hand comprising drawn cards 47 and generated cards 48.

Although the game can be played with a single wager (the single wager determining the number of simultaneously played card hands), it is also possible to create additional opportunities for wagering. For example, after the card set 40 is determined, and before a draw is made to complete the first card hand 41, the player may have an additional opportunity to place an additional wager.

Although all the examples provided in the figures show a sequentially increasing rank occurring in each successive card hand, if an ace occurs in a lower card hand, the next higher rank is a deuce (i.e., a 2)—with subsequent card hands increasing in rank as described above. Hence, the progression of ranks is a continuous loop. In some games, the low card is the ace. With the understanding that the card ranks form a continuous loop, the ranking of each card is determined by adjacent cards in the loop. The absolute ranking, however, may affect the pay tables and the value of winning card combinations.

Because of the looping nature of the hierarchical structure, a card of lesser rank could also be the propagated card 48. Any arithmetical or geometric progression (or progression indicating both arithmetic and geometric progressions) is applicable to the propagation of cards to the simultaneously played card games. For example, the propagated card 48 may escalate by two ranks from the preceding card hand. Alternately, the progression could be to a lesser rank or value in each subsequent card hand. Furthermore, different arithmetic or geometric progression functions may be used to develop the propagated cards 48 for the second card hand 42 from each card held in the first card hand 41.

In yet another embodiment, the "towering" or escalating may be stopped or prohibited from continuing from one hand to the next based upon the occurrence of a predetermined hand. For example, if the first hand 41 included a pair of queens, and the second and third hands 42, 43 towered to a pair of kings and a pair of Aces respectively, the towering may be stopped so as to prevent the continuous loop cycling discussed herein from providing a pair of twos in the fourth hand 44. Thus, the "towering stop" feature may be used to prohibit the perceived unfairness of having a qualifying winning starting hand 41 cycle to present non-winning combinations in later hands 42-45. The "towering stop" feature may cause the towering of cards to stop based upon achieving a certain predetermined hand, or alternatively based upon the fact that further cyclic towering would yield a subsequent hand 44 which is lesser paying than the current towered hand 43. The "towering stop" feature may also include a multiplier so as to compensate the player from the hands 44,45 which were not paid due to the stopping of the towering function. In the example above, the player may receive a multiplier since the stopping of the towering occurred in the third hand 43, thereby prohibiting play of the fourth and fifth hands 44, 45. In one embodiment, the multiplier may be a function of how many hands 44, 45 were remaining when the towering stop feature was activated. Thus, since the player was deprived of the last two hands 44, 45, the third hand 43 may be paid at a 3× multiplier. In addition to multipliers, the "towering stop" feature may include a number of other bonus payments, games, credit amounts, free games, etc. to compensate a player for the lost opportunity of hands which were eliminated from play by the stop feature.

Although the above embodiments are described with respect to a group of card games commonly known as poker, it should be appreciated that the present invention is also applicable to any number of card games such as blackjack, etc. with a hierarchical or value ranked structure.

While the present invention has been described with reference to one or more particular embodiments, those skilled in the art will recognize that many changes may be made thereto without departing from the spirit and scope of the present invention. For example, the embodiments discussed may use a gaming machine which itself determines the game outcome with an onboard central processing unit. Alternately, the gaming machine may be in a network that uses a central processing unit to control and determine the game outcomes for each of the gaming machines in that network. Each of these embodiments and obvious variations thereof is contemplated as falling within the spirit and scope of the claimed invention, which is set forth in the following claims.

What is claimed is:

1. A method of playing a gaming machine, comprising:

displaying a set of cards randomly selected from a group of cards, each of the cards in the group of cards having an individual card rank representing a value of the card relative to other cards in the group of cards such that the cards in the group are capable of being arranged in a sequence of escalating value from a lowest value to a highest value;

selecting hold cards from the set of cards;

forming a first card hand with the hold cards and with sufficient additional cards randomly selected from the group of cards to complete the first card hand;

forming a second card hand having cards with the next sequentially higher individual card rank of each card in the first card hand; and making an award for each card hand with a winning combination.

2. The method as described in claim 1, wherein the additional cards to complete the first card hand are randomly selected from the remaining cards in the group of cards after excluding the set of cards.

3. The method as described in claim 1, wherein each card in the group of cards has a suit, and further wherein the second card hand is formed using the next sequentially higher individual card rank of the same suit of each card in the first card hand.

4. The method as described in claim 3, further including a third card hand formed using the next sequentially higher individual card rank of the same suit of each card in the second card hand.

5. The method as described in claim 1, further including a third card hand formed using the next sequentially higher individual card rank of each card in the second card hand.

6. The method as described in claim 1, wherein the number of hold cards is less than the number of cards in the set of cards.

7. A gaming machine, comprising:

a wager acceptor for accepting a wager to initiate game play;

a central processor unit for forming a first card hand from hold cards selected from a set of cards randomly selected from a group of cards and sufficient additional cards randomly selected from the group of cards to complete the first card hand, each of the cards in the group of cards having an individual card rank and a suit, the individual card rank representing a value of the card relative to other cards in the group of cards such that the cards in the group are capable of being arranged in a sequence of escalating value from a lowest value to a highest value, the central processor unit further for forming a second card hand having cards with the next sequentially higher individual card rank of each hold card and sufficient additional cards to complete the second card hand;

a player input device for selecting the hold cards from the set of cards;

a display in communication with the central processor unit, the display for displaying the set of cards and each card hand; and a payoff mechanism in communication with the central processor unit to make an award for each card hand having a winning combination.

8. The gaming machine as described in claim 7, wherein the additional cards to complete each card hand are randomly selected from the remaining cards in the group of cards after excluding each card already in the card hand.

9. The gaming machine as described in claim 7, wherein the second card hand is formed using the next sequentially higher individual card rank of the same suit of each hold card in the first card hand.

10. A method of playing a gaming machine, comprising:

making a wager to initiate game play;

displaying a set of cards randomly selected from a group of cards, each of the cards in the group of cards having an individual card rank representing a value of the card relative to other cards in the group of cards such that the cards in the group are capable of being arranged in a sequence of escalating value from a lowest value to a highest value;

selecting one or more hold cards from the set of cards;

forming a first card hand with the hold cards and with sufficient additional cards randomly selected from the group of cards to complete the first card hand;

forming a second card hand having one or more cards whose individual card rank is dependent upon, different from, and of a higher or a lower rank than the rank of one or more of the cards in the first card hand and any additional cards sufficient to complete the second card hand; and making an award for each card hand with a winning combination.

11. The method as described in claim 10, wherein the additional cards to complete each card hand are randomly selected from the remaining cards in the group of cards after excluding each card already in the hand.

12. The method as described in claim 10, further including forming a third card hand having one or more cards that are dependent on the individual card rank of one or more of the cards in the first card hand.

13. The method as described in claim 12, wherein the number of card hands formed is dependent on the initial wager made to initiate game play.

14. The method as described in claim 10, wherein each of the one or more cards of the second card hand is dependent on the one or more hold cards of the first card hand.

15. The method as described in claim 14, wherein each card in the group of cards has a suit, and further wherein a portion of the second card hand is formed using the same suit of each of the one or more hold cards.

16. The method as described in claim 15, wherein the portion of the second card hand is formed using the first higher individual card rank of the same suit of each of the one or more hold cards.

17. The method as described in claim 16, wherein the portion of a third card hand is formed using the second higher individual card rank of the same suit of each of the one or more hold cards.

18. The method as described in claim 14, wherein a portion of the second card hand is formed using the first lower individual card rank of each of the one or more hold cards.

19. The method as described in claim 14, wherein the group of cards is a progression of individual card ranks forming a continuous loop.

20. The method as described in claim 19, wherein a portion of the second card hand is formed using an adjacent card in the continuous loop for each of the one or more hold cards.

* * * * *